(12) United States Patent
Jordan et al.

(10) Patent No.: US 9,304,643 B2
(45) Date of Patent: Apr. 5, 2016

(54) CLASSIFYING INPUT OBJECTS INTERACTING WITH A CAPACITIVE BUTTON

(71) Applicant: Synaptics Incorporated, San Jose, CA (US)

(72) Inventors: Joel C. Jordan, Sunnyvale, CA (US); Adam Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/313,711

(22) Filed: Jun. 24, 2014

(65) Prior Publication Data

US 2015/0370364 A1    Dec. 24, 2015

(51) Int. Cl.
*G06F 3/045* (2006.01)
*G06F 3/044* (2006.01)
*G01B 7/00* (2006.01)

(52) U.S. Cl.
CPC ............... *G06F 3/044* (2013.01); *G01B 7/003* (2013.01); *G01B 2210/58* (2013.01); *G06F 2203/04106* (2013.01)

(58) Field of Classification Search
CPC .......... G06F 3/044; G06F 2203/04104; G06F 2203/04106; G06F 2203/04108
See application file for complete search history.

(56) References Cited

U.S. PATENT DOCUMENTS

| | | | |
|---|---|---|---|
| 5,790,106 A * | 8/1998 | Hirano | G06F 3/041 178/18.06 |
| 7,323,886 B2 | 1/2008 | Lee | |
| 8,004,497 B2 | 8/2011 | XiaoPing | |
| 8,059,015 B2 * | 11/2011 | Hua | G06F 3/0202 178/18.05 |
| 8,068,097 B2 | 11/2011 | GuangHai | |
| 8,174,507 B2 | 5/2012 | XiaoPing | |
| 8,228,311 B2 * | 7/2012 | Perski | G06F 3/041 345/173 |
| 8,358,226 B2 | 1/2013 | Reynolds et al. | |
| 8,416,207 B2 * | 4/2013 | Kasajima | G06F 3/0412 178/18.01 |
| 8,482,545 B2 * | 7/2013 | King-Smith | G06F 3/03545 345/173 |
| 8,487,788 B2 | 7/2013 | Reynolds et al. | |
| 8,519,973 B1 | 8/2013 | XiaoPing | |

(Continued)

FOREIGN PATENT DOCUMENTS

WO    2013079267 A1    6/2013

OTHER PUBLICATIONS

International Search Report and Written Opinion dated Jun. 16, 2015 for Application PCT/US2015/024550 Consists of 13 pages.

*Primary Examiner* — Joe H Cheng
(74) *Attorney, Agent, or Firm* — Patterson + Sheridan, LLP

(57) ABSTRACT

Embodiments of the invention generally provide an input device that includes a zero-dimensional button that detects whether an input object is proximate to a sensing region. However, different input objects may provide similar responses which may prevent the input device from accurately determining whether the user actually intended to activate the button. In one embodiment, the input device drives a capacitive sensing signal onto a sensor electrode in the capacitive button and measures at least two resulting signals. The input device then derives capacitance values based on the two resulting signals and uses a ratio between the capacitance values to classifying the interaction with the input object. This ratio enables the input device to distinguish between events that have similar capacitive responses and would otherwise be indistinguishable if only one resulting signal were measured.

22 Claims, 7 Drawing Sheets

(56) References Cited

U.S. PATENT DOCUMENTS

| | | | | |
|---|---|---|---|---|
| 8,546,705 B2* | 10/2013 | Chang | G06F 3/0418 | |
| | | | 178/18.06 | |
| 8,653,834 B2 | 2/2014 | Reynolds | | |
| 9,019,226 B2* | 4/2015 | Karpin | G06F 3/0416 | |
| | | | 178/18.06 | |
| 2008/0012835 A1* | 1/2008 | Rimon | G06F 3/038 | |
| | | | 345/173 | |
| 2008/0048997 A1* | 2/2008 | Gillespie | G06F 3/03547 | |
| | | | 345/174 | |
| 2008/0110739 A1 | 5/2008 | Peng et al. | | |
| 2009/0107737 A1 | 4/2009 | Reynolds et al. | | |
| 2010/0026656 A1 | 2/2010 | Hotelling et al. | | |
| 2010/0110040 A1* | 5/2010 | Kim | G06F 3/0412 | |
| | | | 345/174 | |
| 2010/0321331 A1* | 12/2010 | Oda | G06F 3/044 | |
| | | | 345/174 | |
| 2012/0068966 A1* | 3/2012 | Washburn | G06F 3/044 | |
| | | | 345/174 | |
| 2012/0075249 A1* | 3/2012 | Hoch | G06F 3/044 | |
| | | | 345/174 | |
| 2012/0105362 A1* | 5/2012 | Kremin | G06F 3/03545 | |
| | | | 345/174 | |
| 2012/0249476 A1* | 10/2012 | Schwartz | G06F 3/044 | |
| | | | 345/174 | |
| 2012/0262222 A1* | 10/2012 | Schwartz | G06F 3/0418 | |
| | | | 327/517 | |
| 2012/0268422 A1 | 10/2012 | Hirakawa et al. | | |
| 2012/0310572 A1 | 12/2012 | Jordan | | |
| 2013/0050130 A1* | 2/2013 | Brown | G06F 3/044 | |
| | | | 345/174 | |
| 2013/0162585 A1* | 6/2013 | Schwartz | G06F 3/044 | |
| | | | 345/174 | |
| 2013/0244731 A1* | 9/2013 | Oishi | H04M 1/23 | |
| | | | 455/566 | |
| 2013/0249850 A1* | 9/2013 | Bulea | G06F 3/0418 | |
| | | | 345/174 | |
| 2013/0257786 A1* | 10/2013 | Brown | G06F 3/044 | |
| | | | 345/174 | |
| 2014/0062937 A1* | 3/2014 | Schwartz | G06F 3/0418 | |
| | | | 345/174 | |
| 2014/0160056 A1* | 6/2014 | Mahalingam | G06F 3/044 | |
| | | | 345/174 | |
| 2014/0267087 A1* | 9/2014 | Yousefpor | G06F 3/0412 | |
| | | | 345/173 | |
| 2014/0375571 A1* | 12/2014 | Hirata | G06F 3/0416 | |
| | | | 345/173 | |

* cited by examiner

CLASSIFYING INPUT OBJECTS INTERACTING WITH A CAPACITIVE BUTTON

BACKGROUND

1. Field

Embodiments of the present invention generally relate to zero-dimensional capacitive buttons, and more specifically, to classifying a type of an input object or user interaction with the capacitive button.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is a input device that includes a first plurality of sensor electrodes, a second plurality of sensor electrodes, and a processing system communicatively coupled to the first and second plurality of sensor electrodes. The processing system is configured to operate the first plurality of sensor electrodes to detect positional information for an input object in a first sensing region. Moreover, the processing system is configured to operate the second plurality of sensor electrodes to detect a presence of the input object in a second sensing region by driving a capacitive sensing signal to detect the input object onto at least one of the second plurality of sensor electrodes, receiving a first resulting signal and a second resulting signal on one or more sensor electrodes of the second plurality of sensor electrodes based on driving the capacitive sensing signal, and determining whether the input object is contacting the second sensing region based on a ratio between the first and second resulting signals.

Another embodiment described herein is a processing system that includes a sensor module configured to couple to a first plurality of sensor electrodes to detect a presence of an input object in a zero-dimensional sensing region. The sensor module is configured to drive a capacitive sensing signal to detect the input object onto at least one of the first plurality of sensor electrodes and receive a first resulting signal and a second resulting signal on one or more sensor electrodes of the first plurality of sensor electrodes based on driving the capacitive sensing signal. The processing system also includes a determination module configured to determine whether the input object is contacting the zero-dimensional sensing region based on a ratio between the first and second resulting signals.

Another embodiment described herein is a method that includes driving a capacitive sensing signal onto at least one of a first plurality of sensor electrodes to detect a presence of an input object in a zero-dimensional sensing region. The method also includes receiving a first resulting signal and a second resulting signal on one or more sensor electrodes of the first plurality of sensor electrodes based on driving the capacitive sensing signal and determining whether the input object is contacting the zero-dimensional sensing region based on a ratio between the first and second resulting signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
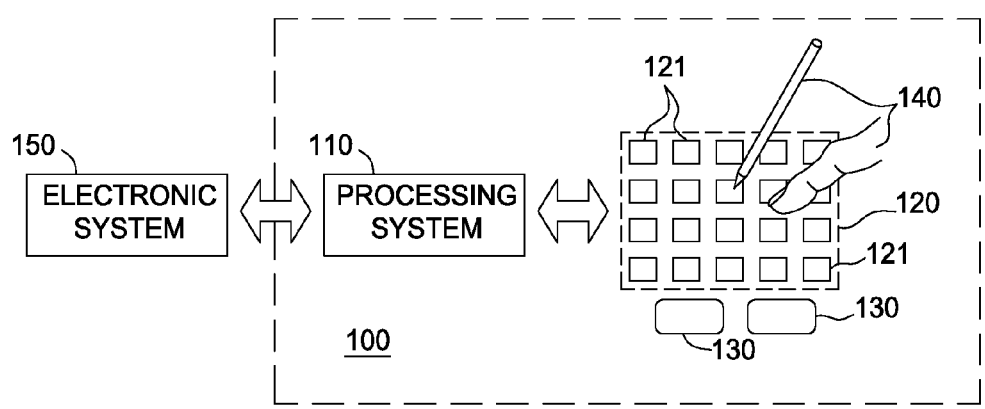
FIG. 1 is a block diagram of an exemplary input device, according to one embodiment described herein.

To facilitate understanding, identical reference numerals have been used, where possible, to designate identical elements that are common to the figures. It is contemplated that elements disclosed in one implementation may be beneficially utilized on other implementation without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. For example, an input device may include a capacitive button that detects whether an input object is proximate to a zero-dimensional sensing region. However, different input objects may provide similar responses which may prevent the input device from accurately determining whether the user actually intends to activate the button. For example, because of the different capacitive properties of a finger and a stylus, a finger hovering over the capacitive button may provide a similar response as a stylus contacting the button. In the case of the hovering finger, the user may not want to activate the button's function, while in the latter case, the user does want to activate the button. However, because the measured capacitive response for both of these scenarios is the same or similar, the input device may be unable to accurately determine the user's intent.

In one embodiment, the input device drives a capacitive sensing signal onto a sensor electrode in the capacitive button and receives at least two resulting signals. These two resulting signals may be received either on two separate sensor electrodes or on the same electrode but during two different time periods. In either case, the input device derives capacitance values based on the two resulting signals and uses a ratio between these capacitance values to classifying the interaction with the input object. This ratio enables the input device to distinguish between events that have similar capacitive responses and would otherwise be indistinguishable if only one resulting signal were measured. For example, the ratio may enable the input device to distinguish between a finger hovering over the button and a stylus contacting the button.

In one embodiment, the input device may include two sensing regions: a first sensing region that collects 1D or 2D positional information related to the input object and a second, zero-dimensional sensing region defined by the capacitive button. For example, the first sensing region may be integrated with a display screen that permits the user to interact with the displayed image. In contrast, the capacitive button may be located separate from the display screen. Nonetheless, in one embodiment, sensor electrodes in the first sensing region may be ohmically coupled to sensor electrodes in the second sensing region and be driven using the same processing system, but this is not a requirement.

FIG. 1 is a block diagram of an exemplary input device 100, according to one embodiment presented herein. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system 150 could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, behind, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In one embodiment, the sensing elements 121 comprise one or more electrodes that are arranged as transmitter and receiver electrodes that at least partially overlap in, for example, mesh pattern. In one embodiment, both the transmitter electrodes and the receiver electrodes 170 are both disposed within a display stack on the display screen substrate. Additionally, at least one of the transmitter and/or receiver electrodes in the display stack may comprise a combination electrode that is used for both capacitive sensing and updating the display. However, in other embodiments, only the transmitter electrodes or only the receiver electrodes (but not both) are disposed within the display stack while other sensor electrodes are outside of the display stack (e.g., disposed on an opposite side of a color filter glass).

In another embodiment, the sensing elements 121 comprises one or sensor electrodes arranged in a matrix array. In one embodiment, all of the sensor electrodes in the matrix array are disposed in a display stack on the display screen substrate. Furthermore, at least one of the sensor electrodes in the display stack may be a combination electrode. However, in other embodiments, only a portion of the sensor electrodes are disposed within the display stack while other sensor electrodes are outside of the display stack (e.g., disposed on an opposite side of a color filter glass).

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), electrowetting, MEMS, or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
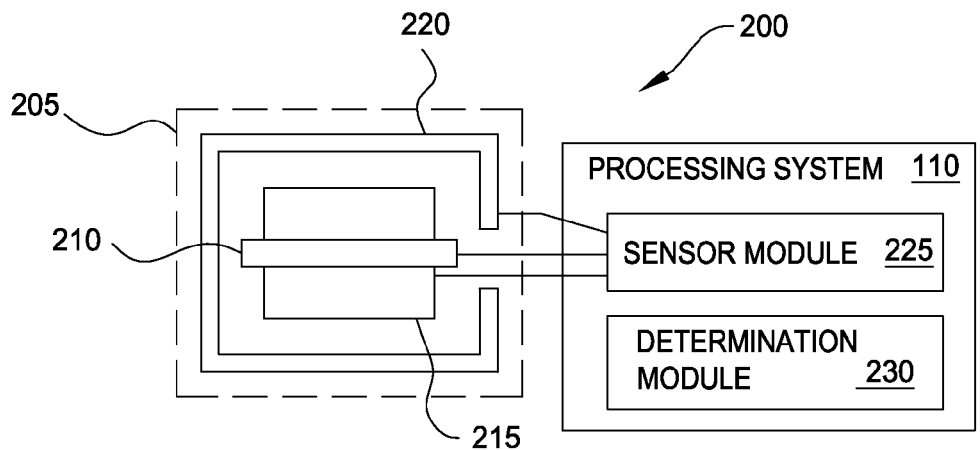
FIG. 2 is a diagram of a zero-dimensional capacitive button coupled to a sensor module, according to one embodiment described herein.

FIG. 2 is a diagram of a zero-dimensional capacitive button 200 coupled to a sensor module 225, according to one example described herein. As defined above, "zero-dimensional" positional information includes near/far or contact/no contact information. Thus, the zero-dimensional capacitive button 200 relies on capacitive sensing techniques to determine whether an input object is proximate to a sensing region 205. In one embodiment, the zero-dimensional sensing region 205 is unable to determine positional location of the input object along a defined axis (e.g., the x- or y-axis). Instead, the processing system 110 detects whether the input object is proximate to the sensing region 205. For example, an input object is proximate to the sensing region 205 when a capacitance value measured using one of more sensor electrodes exceeds one or more predefined thresholds.

The button 200 includes three sensor electrodes: inner receiver electrode 210, transmitter electrode 215, and outer receiver electrode 220. These sensor electrodes 210, 215, 220 may be disposed on multiple planes. For example, the receiver electrode 210 may overlap the transmitter electrode 215, and thus, be located on a different plane (e.g., a different side of a common substrate or a different substrate altogether). Furthermore, the outer receiver electrode 220 may be disposed on the same plane as the receiver electrode 210, the transmitter electrode 215, or be disposed on a separate plane.

The button 200 is coupled to the processing system 110, and more specifically, to sensor module 225. In one embodiment, the sensor module 225 drives a capacitive sensing signal onto at least one of the sensor electrodes (e.g., transmitter electrode 215). As used herein the "capacitive sensing signal" may include a signal suitable to perform absolute capacitive sensing, transcapacitive sensing, or any other suitable capacitive sensing technique. If performing transcapacitive sensing, the capacitive sensing signal driven on transmitter electrode 215 causes a first resulting signal to be received on receiver electrode 210 and a second resulting signal to be received on receiver electrode 220. These resulting signals may include effects from input objects that are proximate to the sensing region 205. As described herein, the resulting signal increases when an input object is proximate to the sensing region 205. However, the capacitance value may decrease or increase depending on the measurement scheme used by the sensor module 225. Notably, the change in the resulting signal(s), either increasing or decreasing, that may be used by the determination module 230 to determine if an input object is interacting with the input device. Using the resulting signals, the sensor module 225 derives a capacitance value, such as a change in capacitance, which the determination module 230 then uses to determine whether an input object is proximate to the sensing region 205. A more detailed discussion of how the sensor and determination modules 225, 230 use the two resulting signals to detect input objects is provided below with the discussion accompanying FIGS. 5A-5B and 6A-6B.

The shape of the transmitter electrode 215 and receiver electrodes 210, 220 shown in FIG. 2 are not intended to be limiting. For example, the receiver electrode 220 may surround receiver electrode 210 on only one, two, or three sides rather than four sides as shown. In one embodiment, receiver electrode 220 may be arranged so that no portion of this electrode 220 is located at the geometrical center of the button 200. As will be described in more detail later, using two receiver electrodes 210, 220 provide different resulting signals that are used to classify input objects. As such, any arrangement of the sensor electrodes 210 and 220 that permit the processing system 110 to distinguish between different types of input objects or different types of user interaction with the input object are considered to be within the scope of this disclosure. Although not shown, in some embodiments an additional dielectric layer is disposed above the sensor electrodes which forms a contact surface which the input object contacts when interacting with the input device.

Instead of having sensor electrode 215 being a transmitter electrode and the sensor electrodes 210, 220 being receiver electrodes, in one implementation of transcapacitive sensing, sensor electrode 215 is a receiver electrode while sensor electrodes 210 and 215 are transmitter electrodes. In this example, at Time 1, the sensor module 225 drives the capacitive sensing signal onto one of the transmitter electrodes 210, 220 and measures a first resulting signal on receiver electrodes 215. At Time 2, the sensor module 225 drives the capacitive sensing signal onto the other transmitter electrode 210 or 220 (but not on the transmitter electrode driven during Time 1) and measures a second resulting signal on the receiver electrode 215. The resulting signals measured during the two non-overlapping time periods Time 1 and Time 2 are similar to the result signals measured in the previous example where the roles of the sensor electrodes 210, 215, and 220 are reversed. As such, the determination module 230 can process the two resulting signals and determine whether an input object is proximate to the sensing region 205.

Figure 3:
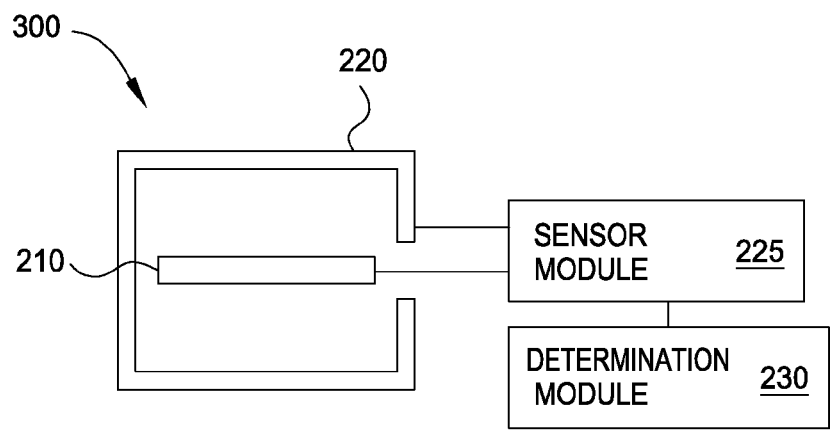
FIG. 3 is a diagram of a zero-dimensional capacitive button for performing absolute capacitive sensing, according to one embodiment described herein.

FIG. 3 is a diagram of a zero-dimensional capacitive button 300 for performing absolute capacitive sensing, according to one example described herein. FIG. 3 is similar to the FIG. 2 except that the sensor electrode 215 is omitted. That is, instead of using three sensor electrodes when performing transcapacitive sensing, only two sensor electrodes are needed to perform absolute capacitance sensing. For example, the sensor module 225 drives the capacitive sensing signal onto both sensor electrode 210 and 220, and also measures respective resulting signals from the electrodes 210, 220. In one embodiment, the sensor module may drive the capacitance sensing signal and measure the resulting signals in parallel or in two non-overlapping time periods. As an example of the latter, during Time 1, the sensor module 225 drives the capacitive sensing signal and measures the first resulting signal on sensor electrode 210 and, during Time 2, drives the capacitive sensing signal and measures the second resulting signal on sensor electrode 220. In either case, the two resulting signals can then be used by the determination module (not shown) to determine whether an input object is proximate to the button 300.

In one embodiment, absolute capacitance sensing may be performed using the button 200 shown in FIG. 2. For example, the sensor electrode 215 may be left electrically floating, driven to a constant voltage (e.g., system ground), or driven with a guarding signal while the sensor electrodes 210 and 220 are used to drive the capacitive sensing signal and measure the resulting signals. In another embodiment, the sensor electrode 215 may be used along with sensor electrode 220 to measure the resulting signals, while sensor electrode 210 is unused or grounded.

Figure 4:
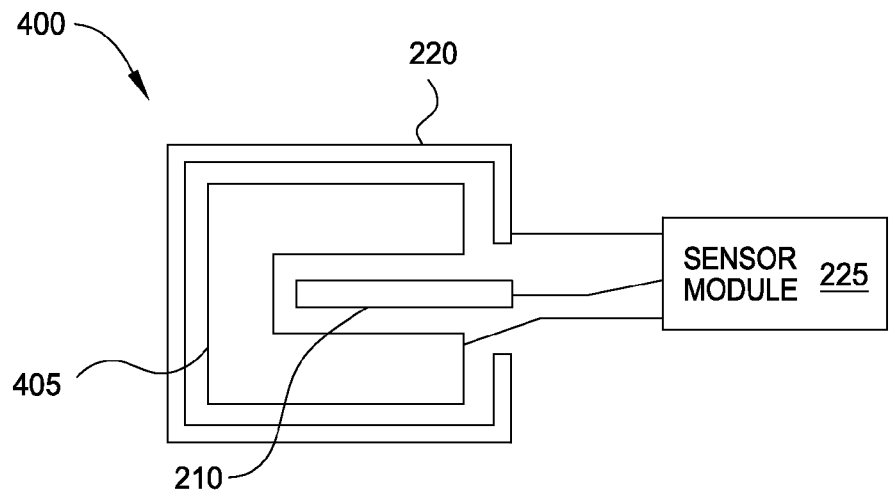
FIG. 4 is a diagram of a co-planar zero-dimensional capacitive button, according to one embodiment described herein.

FIG. 4 is a diagram of a co-planar zero-dimensional capacitive button 400, according to one example described herein.

As shown, the sensor electrodes 210, 220, and 405 are disposed on a common plane. For example, each of these sensor electrodes 210, 220, and 405 may be disposed on the same surface of a substrate. Moreover, button 400 may be used to perform either transcapacitive or absolute capacitance sensing. For example, the sensor electrode 405 may be used as a transmitter electrode while sensor electrodes 210 and 220 are receiver electrodes. Alternatively, sensor electrodes 210 and 220 may be used to perform absolute capacitive sensing, while sensor electrode 405 is unused or grounded.

Figure 5A:
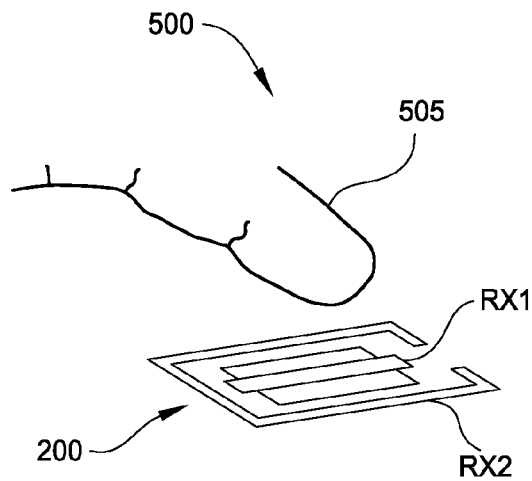
FIGS. 5A-5B illustrate the capacitance measured by a zero-dimensional capacitive button in response to a hovering finger, according to one embodiment described herein.
Figure 5B:
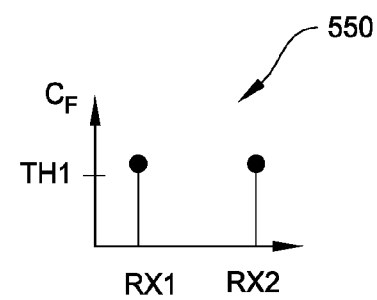

FIGS. 5A-5B illustrate the capacitance measured by the zero-dimensional button 200 in response to a hovering finger, according to one example described herein. Specifically, FIG. 5A illustrates a system 500 that includes a finger 505 hovering over the button 200. For convenience, the button 200 shown here is assumed to have the same structure as the button 200 discussed in FIG. 2.

FIG. 5B includes a graph 550 that illustrates capacitance values ($C_F$) measured in response to the hovering finger using the sensor electrodes in system 500. That is, graph 550 illustrates a first capacitance value (e.g., a change in capacitance relative to a baseline measurement) derived from a resulting signal received on sensor electrode RX1 and a second capacitance value derived from a resulting signal received on sensor electrode RX2. As shown, the magnitudes of these two values are approximately equal. Of course, the precise measurements and relationship between the RX1 and RX2 capacitance values will vary depending on the design of the sensor electrodes RX1 and RX2 in button 200. Furthermore, the capacitance values shown in graph 550 are measured using transcapacitance sensing but the embodiments described below are not limited to such and apply equally to other capacitive sensing techniques such as absolute capacitance sensing.

Figure 6A:
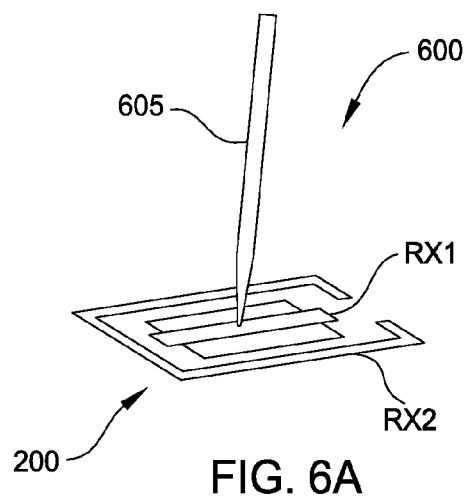
FIGS. 6A-6B illustrate the capacitance measured by a zero-dimensional capacitive button in response to a stylus, according to one embodiment described herein.
Figure 6B:
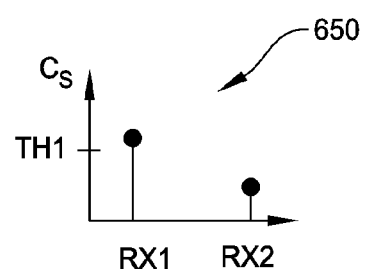

FIGS. 6A-6B illustrate the capacitance measured by the zero-dimensional button 200 in response to a stylus 605, according to one example described herein. Specifically, FIG. 5A illustrates a system 600 where the stylus 605 directly contacts a sensing region corresponding to the button 200. That is, unlike system 500 where the finger 505 hovers over the button 200, the stylus 605 contacts the input device that includes the button 200.

FIG. 6B provides a chart 650 which illustrates the capacitance values ($C_S$) measured in response to the stylus using the sensor electrodes in system 600. Comparing the capacitance values in chart 650 to the values in chart 550, the values measured using the sensor electrode RX1 ($C_{RX1}$) are substantially the same. Thus, if the button 200 included RX1 but not RX2, the input device would be unable to distinguish the hovering finger 505 shown in FIG. 5A from the contacting stylus 605 shown in FIG. 6A. Stated differently, the capacitive characteristics of the finger 505 and stylus 605 are such that when performing capacitive sensing, the finger 505 can be hovering over the input device and still generate the same capacitance value as the stylus that directly contacts the input device. This relationship between the finger 505 and stylus 605 presents a problem to a system designer who wants to configure the input device to detect when the user intends to activate the button 200. For example, to detect that the stylus 605 has contacted button 200, the designer may set a threshold (TH1) on graph 650 so that once the measured capacitance value of RX1 exceeds this threshold, the function of the button 200 is activated. However, doing so may cause the input device to falsely activate the button when the user did not intend to do so. Referring back to chart 550, the capacitance value measured by RX1 also exceeds the threshold TH1 when the user's finger 505 merely hovers, but does not contact, the button 200. Nonetheless, because the threshold TH1 has been exceeded, the input device will activate the button's function which may be contrary to the user's intentions. The system designer could increase the threshold TH1 so it exceeds the magnitude of the capacitance value measured when the finger 505 hovers over the input device, but when the user intends to activate the button 200 using the stylus 605, the threshold TH1 would not be exceeded and the button's function would not be activated.

To detect when an input object that has a small effect on the measured capacitance contacts the button 200, the input device also measures the capacitance value of RX2. As shown by graphs 550 and 650, the capacitance values measured using RX2 ($C_{RX2}$) when the finger 550 hovers over the button 200 compared to when the stylus 605 contacts the buttons varies substantially. As shown, the capacitance value measured on RX2 is affected more by the finger 505 than the stylus 605. This change in the capacitance values on RX2 is attributable, at least partly, to the different shape and arrangement of RX2 in the button 200 relative to RX1. Thus, charts 550 and 650 establish the principle that the shape and design on the sensor electrodes may be used to distinguish and classify different types of input objects (e.g., finger versus stylus) as well as different types of interactions (e.g., contacting versus hovering). For example, changes in the capacitance between RX1 and the input object may be used to detect a touching object (whether it is a large or small object), while changes in the capacitance between RX2 and the input object are used to distinguish a small input object touching the button 200 from a larger input object hovering over the button 200. However, as discussed above, the sensor electrodes RX1 and RX2 may have different shapes or arrangements and still be used to classify input object and/or user interactions.

Once the resulting signals are measured on RX1 and RX2, the determination module may use the derived capacitance values to determine whether the user intended to activate the button. In one example, the determination module uses a ratio between the capacitance values to classify the user interaction. As indicated in graphs 550 and 650, the ratio of $C_{RX1}/C_{RX2}$ for the hovering finger 505 is less than the ratio of $C_{RX1}/C_{RX2}$ for the contacting stylus 605. Note that a similar approach is used to set thresholds for $C_{RX1}$ and $C_{RX2}$. However, using a ratio is advantageous because it is less sensitive to part-to-part manufacturing variations.

The determination module in the input device may also use the threshold TH1 introduced earlier as a baseline threshold to set the minimum capacitance value required before the button function is activated. If the capacitance value measured on RX1 ($C_{RX1}$) is below this value, the button is not activated. In addition, to prevent a false activation when the finger 505 merely hovers over the button 200, the determination module may use a second threshold (TH2) that is compared to the ratio of the capacitance values measured on RX1 and RX2. For the example, the threshold TH2 may be set to a value greater than the ratio $C_{RX1}/C_{RX2}$ measured when the finger 505 hovers over the button 200 but less than the ratio $C_{RX1}/C_{RX2}$ measured when the stylus 605 contacts the button 200. In this manner, if the currently measured value of $C_{RX1}/C_{RX2}$ is below the threshold TH2, the input device classifies the input object as a hovering finger and does not activate the button, while if the value of $C_{RX1}/C_{RX2}$ is above the threshold TH2, the input object is classified as a stylus contacting the button 200, and thus, the function of the button 200 is activated. This logic is shown in Equation 1:

$$\text{Activate Button if} \begin{cases} C_{RX1} > TH1; \text{ and} \\ C_{RX1}/C_{RX2} > TH2 \end{cases} \quad (1)$$

In one embodiment, the threshold TH2 may be set so that whenever $C_{RX2}$ is greater than $C_{RX1}$, the input device will not activate the function of the button 200. That is, because the sensor electrode RX2 surrounds the periphery of the button 200 while sensor electrode RX1 extends through the center of the button 200, if $C_{RX2}$ is greater than $C_{RX1}$, the input device determines that the user is not intending to activate the button 200. For example, the value of TH2 may be set to a value that is greater than one. Thus, if the value of $C_{RX2}$ ever meets or exceeds the value of $C_{RX1}$ then the second condition in Equation 1 will be false and the button 200 will not be activated.

Additionally, in one embodiment, the value of threshold TH2 may be selected to enable the sensor module to detect when the finger 505, in addition to when a stylus, directly contacts the button 200. For example, once the finger 505 contacts the surface of the button 200, the capacitance value measured on RX1 may increase or the capacitance value measured on RX2 may decrease (or both) such that the ratio of $C_{RX1}/C_{RX2}$ is still greater than threshold TH2. In this example, the input device can distinguish between a hovering finger (i.e., when the ratio is less than TH2) and a contacting finger (i.e., when the ratio is greater than or equal to TH2) and activate the button 200 only if the latter event is detected.

Alternatively or additionally, the input device may include a third threshold TH3 for determining between the 605 stylus contacting the button 200 and the finger 505 contacting the button 200. For example, it may be possible that when the finger 505 contacts the button 200 that the ratio of $C_{RX1}/C_{RX2} > TH2$ is not true. In such a case, according to the logic shown in Equation 1, the button is not activated which may be contrary to the user's intent. As such, Equation 2 includes additional logic to distinguish between contacting the button 200 with the finger 505 and the stylus 605.

$$\text{Activate Button if} \begin{cases} C_{RX1} > TH1 \text{ and } C_{RX1}/C_{RX2} > TH2; \text{ or} \\ C_{RX1} > TH3, \text{ where } TH3 > TH1 \end{cases} \quad (2)$$

In Equation 2, the button is activated if Equation 1 is true—i.e., $C_{RX1}$ is greater than the minimum threshold TH1 and the ratio of $C_{RX1}$ and $C_{RX1}$ is greater than TH2 or if $C_{RX1}$ is greater than threshold TH3. Moreover, the value of threshold TH3 is set to be greater than the value of threshold TH1. For example, threshold TH3 may be greater than the $C_{RX1}$ value shown in graph 550 when the finger 505 merely hovers over the button 200.

Figure 7A:
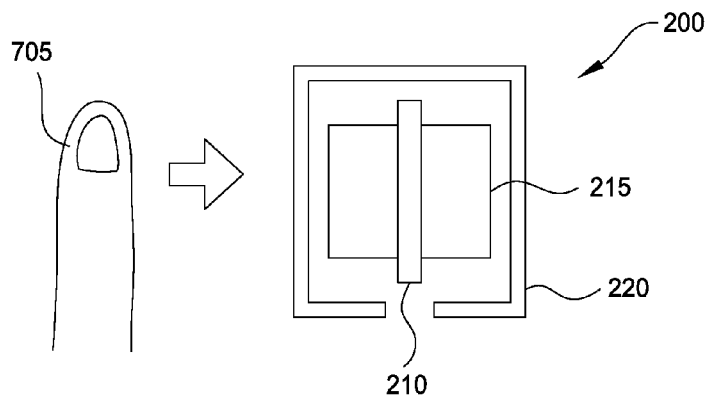
FIGS. 7A-7C illustrate the capacitive response of dragging a finger across a zero-dimensional capacitive button, according to one embodiment described herein.
Figure 7B:
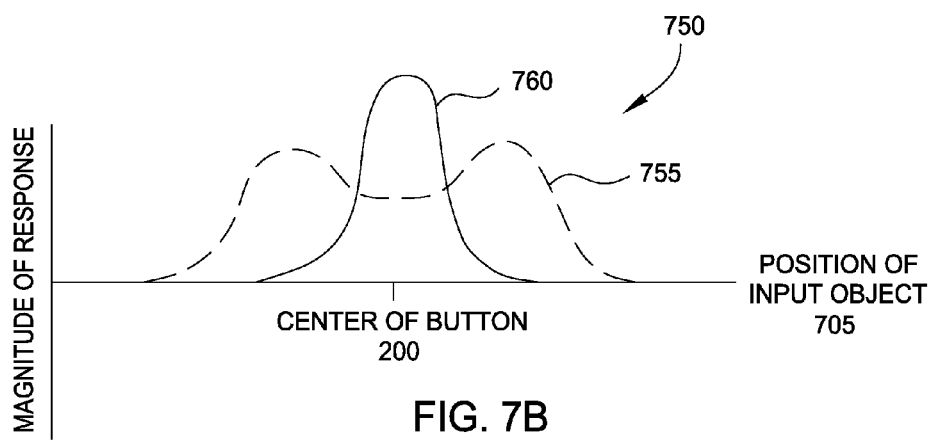
Figure 7C:
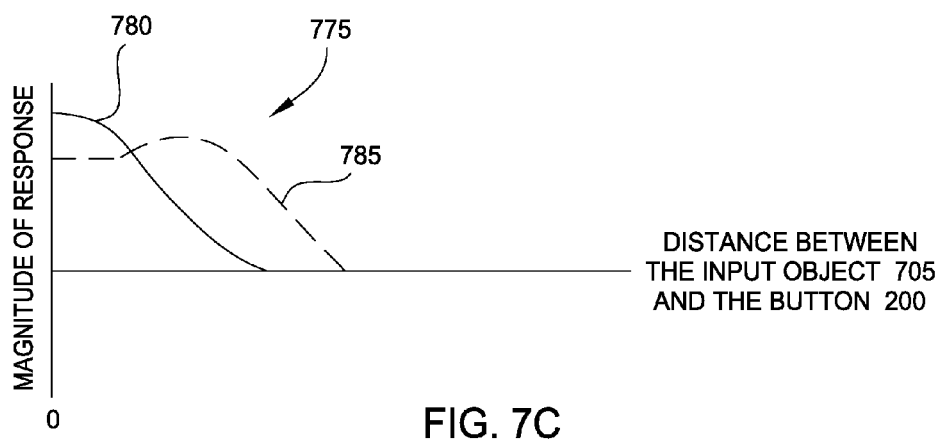

FIGS. 7A-7C illustrate the capacitive response of moving a finger 705 relative to the zero-dimensional button 200, according to one example described herein. That is, in contrast to FIGS. 5A-5B and 6A-6B which illustrate the capacitance response for input objects during a specific instance of time, FIGS. 7A-7C illustrate the capacitance value over a period of time. FIG. 7A illustrates the button 200 with the finger 705 being moved over the button 200 from left to right. The finger 705 may be either contacting a surface of the input device or hovering over the surface. FIG. 7B provides a chart 750 that illustrates the change in the capacitance values measured on the sensor electrodes 210 (i.e., RX1) and 220 (i.e., RX2). As the finger 705 moves from right to left, the capacitance response 755 measured on sensor electrode 220 includes two maxima that correspond to where the finger 705 crosses the sensor electrode 220 in two places. The capacitance response 760 measured on the sensor electrode 210 has one maximum that corresponds to where the finger 705 crosses over the sensor electrode 210.

Unlike FIGS. 7A and 7B, FIG. 7C illustrates the capacitance response as a function of the distance between the input object and the surface of the button 200. Specifically, the measurements in chart 775 are taken as the input object 200 remains aligned with the center of the button 200 and the distance between the input object 200 and surface of the button 200 varies. As shown, capacitance response 780 corresponding to sensor electrode 210 generally increases as the distance between the input object 705 and button 200 decreases. The capacitance response 785 corresponding to sensor electrode 220, however, may or may not depend on the input object. For example, as the stylus centered over electrode 210 approaches the button 200, the capacitance response 785 may reach a maximum some distance away from the button 200 and level off or even decrease as the separation distance continues to shrink. Of course, this response will vary depending on the dimensions and capacitive properties of the input object as well as the shape of the outer sensor electrode 220. For example, with other button designs (or with other input objects) the capacitance response 785 may be similar to response 780 which constantly increases as the separation distance decreases.

Figure 8:
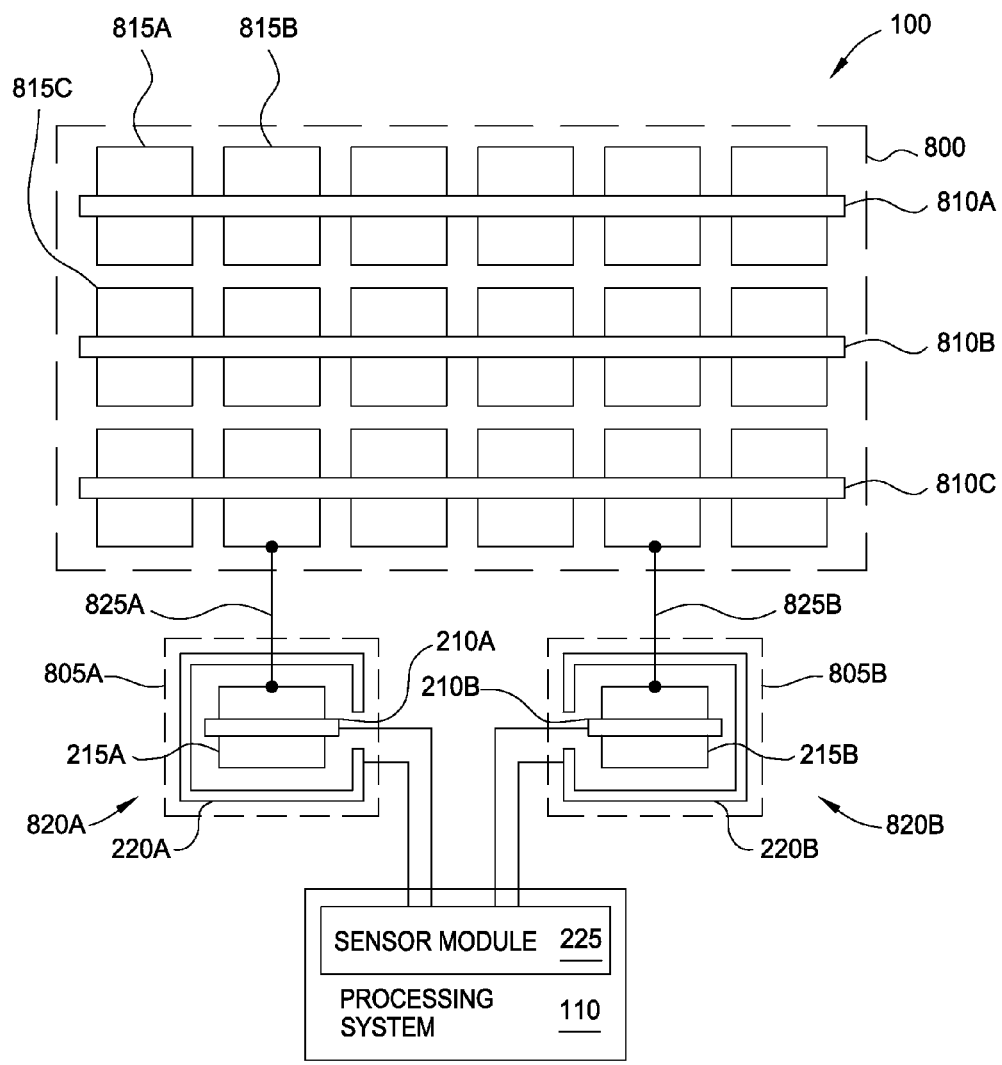
FIG. 8 illustrates an input device that includes a first sensing region and a second sensing region, according to one embodiment described herein.

FIG. 8 illustrates the input device 100 which includes a first sensing region 800 and second sensing regions 805A and 805B, according to one embodiment described herein. As shown, the first sensing region 800 is a 2D sensing region that can identify the positional location of an input object in two dimensions (e.g., along the x- and y-axes). The first sensing region 800 includes receiver electrodes 810 and transmitter electrodes 815 that establish a plurality of capacitive pixels. In one embodiment, the first sensing region 800 is integrated with a display (e.g., the transmitter and receiver electrodes 810, 815 are made from a transparent material) which permits the user to provide input to interact with a displayed image. Furthermore, to measure the positional information in region 800, the input device 100 may use either transcapacitive sensing, absolute capacitance sensing, or some combination of both.

The second sensing regions 805A and 805B are zero-dimensional sensing regions defined by buttons 820A and 820B. In another embodiment, the second sensing regions 805A and 805B are not integrated with the display. That is, these regions 805 do not display any portion of the image. For example, the buttons 820 may be located at the periphery of the first sensing region 800 and the display area. Nonetheless, the second sensing regions 805 are ohmically coupled to the first sensing region 800 via the traces 825A and 825B. In this example, transmitter electrodes 815 in the first sensing region 800 are coupled to respective transmitter electrodes 215 in the buttons 820. Doing so may reduce routing in the input device 100 by reducing the number of traces coupled to the sensor module 225. For example, instead of the sensor module 225 having to drive the transmitter electrodes 815 in the first sensing region 800 separate from the transmitter electrodes 215 in the second sensing regions 805, the sensor module 225 need only drive the capacitive sensing signal onto the transmitters 815, which then transmit the capacitive sensing signal onto the transmitter electrodes 215 via the traces 825 (or vice versa). As such, the sensor module 225 does not need separate traces between itself and the transmitter electrodes 215. Moreover, although FIG. 8 illustrates using traces 825 to drive the capacitive sensing signal onto transmitter electrodes 215, in another embodiment, respective transmitter electrodes 815 in the first sensing region 800 may extend out of the first sensing region and into the second sensing regions 805.

Alternatively, the sensor electrodes 210 and 220 may be connected to one or more transmitter electrodes 815 in the first sensing region 800. That is, instead of transmitting the capacitive sensing signal on sensor electrode 215, the input device transmits the capacitive sensing signal onto the sensor electrodes 210 and 220 during two non-overlapping time periods. The resulting signal for each of these time periods is then measured using sensor electrode 215. To do so, instead of the sensor electrodes 210 and 220 having independent traces coupled to the sensor electrodes 215 as is shown in FIG. 8, sensor electrodes 215 would have independent traces to the sensor module 225.

In another embodiment, the receiver electrodes 810 in the first sensing region 800 may extend into the second sensing regions 805 to serve as the sensor electrodes 210 and 220. During a first time period, the sensor module 225 receives resulting signals using the receiver electrodes 810 to determine positional information in the first sensing region 800. However, during a second time period, the sensor module 225 drives the capacitive sensing signal onto the sensor electrodes 215 in buttons 820 and measures resulting signals on the receiver electrodes 810 extending into the second sensing regions 805 to determine whether to activate the buttons 820. Thus, in all the examples described above with FIG. 8, a 2D sensing region may be ohmically connected to one or more zero-dimensional sensing regions which may reduce routing congestion in the input device 100.

However, in other embodiments, the first sensing region 800 may be operated independently from one or both of the second sensing regions 805. That is, the first and second sensing regions 800, 805 may not be ohmically coupled. For example, input device 100 may not include the traces 825 or none of the transmitter and/or receiver electrodes 810, 815 extend into the second sensing regions 805. Furthermore, the input device 100 may use separate processing systems 110 (e.g., separate ICs) for controlling the first and second sensing regions 800, 805 rather than using the same processing system 110 as described above.

Figure 9:
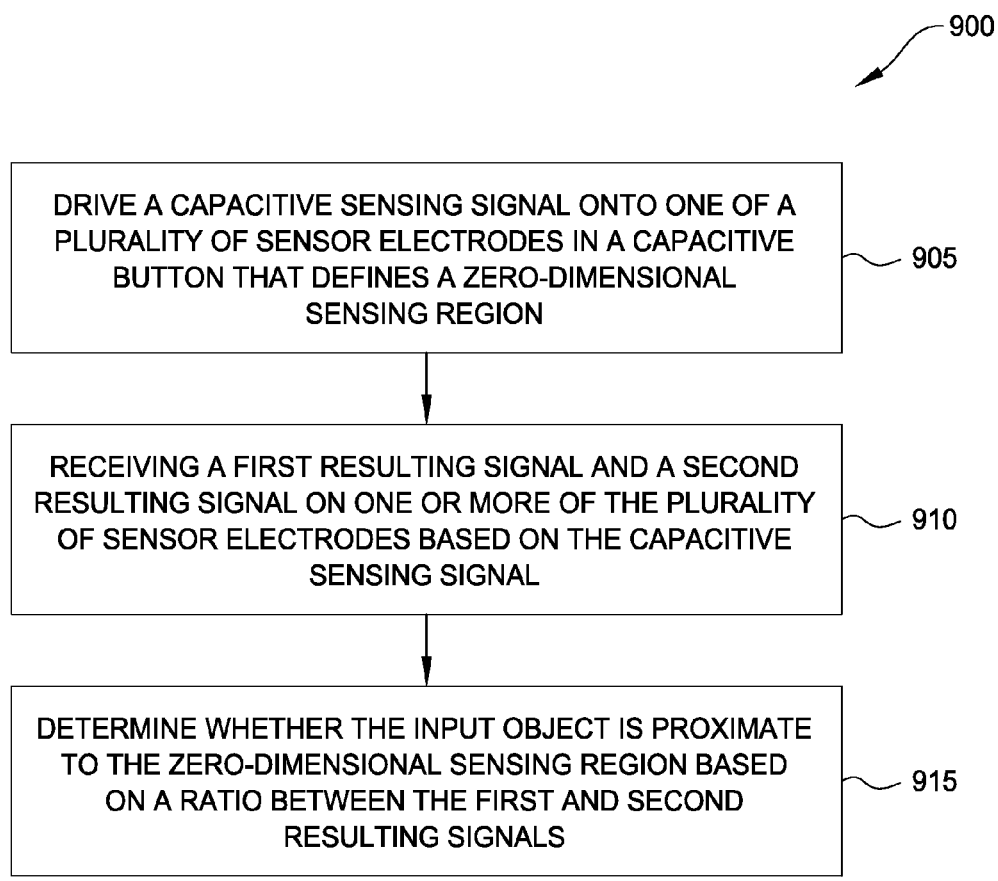
FIG. 9 is a flow chart for detecting an input object based on a ratio between two resulting signals, according to one embodiment described herein.

FIG. 9 is a flow chart 900 for detecting an input object based on a ratio between capacitive values derived from two resulting signals, according to one example described herein. At block 905, the sensor module drives a capacitive sensing signal onto one of a plurality of sensor electrodes in a capacitive button that defines a zero-dimensional sensing region. At block 910, the sensor module receives a first resulting signal and a second resulting signal on one or more of the plurality of sensor electrodes in response to the capacitive sensing signal. In one embodiment, the sensor module performs transcapacitive sensing by driving the capacitive sensing signal on one transmitter electrode while receiving the two resulting signals on respective receiver electrodes in parallel. In another embodiment, the sensor module performs transcapacitive sensing by driving, during a first time period, the capacitive sensing signal onto a first transmitter electrode and receiving the first resulting signal on a receiver electrode. During a second time period, the sensor module drives the capacitive sensing signal onto a second transmitter electrode and receives the second resulting signal on the same receiver electrode. Alternatively, the sensor module may perform absolute capacitance sensing by driving the capacitive sensing signal onto a first sensing electrode while measuring a first resulting signal on the first electrode. In addition, the sensor module drives the capacitive sensing signal onto a second sensing electrode while measuring a second resulting signal on the second electrode. The sensor module may drive the capacitive sensing signal onto the first and second sensor electrodes either in parallel or during separate time periods.

At block 915, the determination module determines whether the input object is proximate to the zero-dimensional sensing region based on a ratio between capacitive values derived from the first and second resulting signals. In one embodiment, the ratio between the capacitive values permit the determination module to identify (or classify) the type of the input object or a type of user interaction with the input object. For example, as shown in Equations 1 and 2 above, the threshold TH2 may be set so that only input objects that contact the button active the function of the button while other types of interactions, such as a finger hovering over the button, are excluded. In this manner, the two resulting signals are used to distinguish between different types of user interactions and/or input objects.

Figure 10:
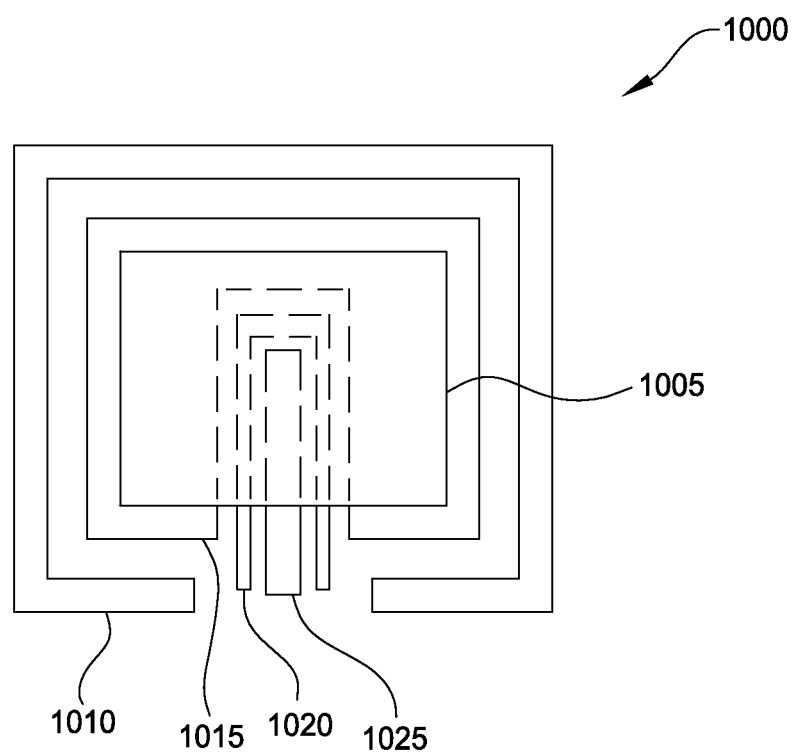
FIG. 10 is a diagram of a zero-dimensional capacitive button with an electrically floating conductor, according to one embodiment described herein.

FIG. 10 is a diagram of a zero-dimensional capacitive button 1000 with an electrically floating conductor 1005, according to one embodiment described herein. As shown, the floating conductor 1005 overlaps at least a portion of a transmitter electrode 1015, ground electrode 1020, and receiver electrode 1025. However, the floating conductor 1005 does not cover at least a portion of the periphery of the transmitter electrode 1015 which permits the fringe lines to extend form the transmitter electrode 1015 to the receiver electrode 1010. The use of the floating conductor 1005 above a 0D button has the benefit of making the response to an input object more uniform across the button 1000 and also makes a transcapacitive sensor design behave similarly to an absolute capacitance button. This can be advantageous under circumstances in which the input object is not well grounded to the sensor module (for example, if the input object is a finger and the user is not holding the device).

In button 1000, the receiver electrodes 1010 and 1025 and transmitter electrode 1015 may be used to perform transcapacitive or absolute capacitance sensing as discussed with the button 200 shown in FIG. 2. As such, when performing absolute capacitance sensing, the transmitter electrode 1015 may not be needed (e.g., may be omitted), or the electrode 1015 is grounded or driven with a guarding signal.

In one embodiment, the receiver electrodes 1010 and 1025, transmitter electrode 1015, and ground electrode 1020 are co-planar (i.e., disposed on the same plane) while the floating conductor 1005 is disposed on a different plane. For example, the floating conductor 1005 may be disposed on a first side of a substrate while the rest of the electrodes are disposed on the opposite side of the substrate. Furthermore, the floating conductor 1005 may be made from any suitable electrically conductive material such as copper, gold, indium tin oxide, etc.

Although a square shape for the floating conductor 1005 is shown, the conductor 1005 may be a different shape such as a rectangle, oval, and the like. In one example, the floating conductor 1005 may include slots extending from its outer boundary towards the center that provide additional paths for the fringe lines to extend between the transmitter electrode 1015 and receiver electrode 1010.

CONCLUSION

Various embodiments of the present technology provide input devices and methods for improving usability. As discussed above, an input device may include a zero-dimensional button that detects whether an input object is proximate to a sensing region. However, different input objects may provide similar responses which may prevent the input device from accurately determining whether the user actually intended to activate the button. In one embodiment, the input device drives a capacitive sensing signal onto a sensor electrode in the capacitive button and measures at least two resulting signals. These two resulting signals may be measured either on two separate sensor electrodes or on the same electrode but at two different time periods. In either case, the input device derives capacitance values based on the two resulting signals and uses a ratio between the capacitance values to classifying the interaction with the input object. This ratio enables the input device to distinguish between events that have similar capacitive responses and would otherwise be indistinguishable if only one resulting signal were measured.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. An input device, comprising:
 a first plurality of sensor electrodes;
 a second plurality of sensor electrodes;
 a processing system communicatively coupled to the first and second plurality of sensor electrodes, the processing system configured to:
  operate the first plurality of sensor electrodes to detect positional information for an input object in a first sensing region;
  operate the second plurality of sensor electrodes to detect a presence of the input object in a second sensing region by:
   driving a capacitive sensing signal to detect the input object onto at least one of the second plurality of sensor electrodes,
   receiving a first resulting signal and a second resulting signal on one or more sensor electrodes of the second plurality of sensor electrodes based on driving the capacitive sensing signal, and
   determining whether the input object is contacting the second sensing region based on a ratio between the first and second resulting signals.

2. The input device of claim 1, wherein one of: (i) the first resulting signal is received on a first sensor electrode of the second plurality of sensor electrodes, the second resulting signal is received on a second, different sensor electrode of the second plurality of sensor electrodes, and the capacitive sensing signal is driven onto a third sensor electrode of the second plurality of sensor electrodes different from the first and second sensor electrodes and (ii) the capacitive sensing signal is driven on multiple sensor electrodes of the second plurality of sensor electrodes at different time intervals and the first and second resulting signals are received using only one of the second plurality of sensor electrodes.

3. The input device of claim 1, wherein the processing system is configured to:
 determine that the input object is contacting the second sensing region if (i) the ratio satisfies a first predetermined threshold and (ii) a value of the first resulting signal satisfies a second predetermined threshold; and
 classifying the input object as a contacting finger, a hovering finger, or a contacting stylus based on the first and second resulting signals.

4. The input device of claim 1, wherein the processing system is configured to:
- determine that the input object is a stylus contacting the second sensing region when (i) the ratio satisfies a first predetermined threshold and (ii) a value of the first resulting signal satisfies a second predetermined threshold; and
- determine that the input object is a finger contacting the second sensing region when (i) the value of the first resulting signal satisfies a third predetermined threshold greater than the second predetermined threshold.

5. The input device of claim 1, wherein the first sensing region detects the positional information of the input object in at least two dimensions and the second sensing region is a zero-dimensional sensing region.

6. The input device of claim 1, wherein a first sensor electrode of the second plurality of sensor electrodes in the second sensing region is ohmically coupled to a first sensor electrode of the first plurality of sensor electrodes in the first sensing region, and wherein the processing system is configured to simultaneously drive the capacitive sensing signal on both the first sensor electrode of the second plurality of sensor electrodes and the first sensor electrode of the first plurality of sensor electrodes.

7. The input device of claim 1, wherein a first sensor electrode of the second plurality of sensor electrodes in the second sensing region is ohmically coupled to a first sensor electrode of the first plurality of sensor electrodes in the first sensing region, and wherein the processing system is configured to receive the first or second resulting signal from the first sensor electrode of the second plurality of sensor electrodes via the first sensor electrode of the first plurality of sensor electrodes.

8. The input device of claim 1, further comprising:
- an electrically floating conductor that overlaps at least a portion of one of the second plurality of sensor electrodes.

9. The input device of claim 1, wherein the processing system is configured to perform transcapacitive sensing in the second sensing region by driving the capacitive sensing signal onto a first sensor electrode of the second plurality of sensor electrodes and receiving the first and second resulting signal on respective sensor electrodes of the second plurality of sensor electrodes different from the first sensor electrode.

10. The input device of claim 1, wherein the processing system is configured to perform absolute capacitive sensing in the second sensing region by (i) driving the capacitive sensing signal onto a first sensor electrode of the second plurality of sensor electrodes and receiving the first resulting signal on the first sensor electrode and (ii) driving the capacitive sensing signal onto a second sensor electrode of the second plurality of sensor electrodes and receiving the second resulting signal on the second sensor electrode.

11. A processing system, comprising:
- a sensor module configured to couple to a first plurality of sensor electrodes to detect a presence of an input object in a zero-dimensional sensing region, the sensor module configured to:
  - drive a capacitive sensing signal to detect the input object onto at least one of the first plurality of sensor electrodes, and
  - receive a first resulting signal and a second resulting signal on one or more sensor electrodes of the first plurality of sensor electrodes based on driving the capacitive sensing signal; and
- a determination module configured to determine whether the input object is contacting the zero-dimensional sensing region based on a ratio between the first and second resulting signals.

12. The processing system of claim 11, wherein the determination module is configured to determine that the input object is contacting the sensing region if (i) the ratio satisfies a first predetermined threshold and (ii) a value of the first resulting signal satisfies a second predetermined threshold.

13. The processing system of claim 11, wherein the sensor module is configured to couple to a second plurality of sensor electrodes, the sensor module configured to drive the capacitive signal onto the second plurality of sensor electrodes to determine a position of the input object in a different sensing region in at least two dimensions.

14. The processing system of claim 13, wherein the sensor module is configured to simultaneously drive the capacitive sensing signal on both a first sensor electrode of the first plurality of sensor electrodes and a first sensor electrode of the second plurality of sensor electrodes.

15. The processing system of claim 11, wherein the sensor module is configured to perform transcapacitive sensing in the zero-dimensional sensing region by driving the capacitive sensing signal onto a first sensor electrode of the first plurality of sensor electrodes and receiving the first and second resulting signal on respective sensor electrodes of the first plurality of sensor electrodes different from the first sensor electrode.

16. The processing system of claim 11, wherein the sensor module is configured to perform absolute capacitive sensing in the zero-dimensional sensing region by (i) driving the capacitive sensing signal onto a first sensor electrode of the first plurality of sensor electrodes and receiving the first resulting signal on the first sensor electrode and (ii) driving the capacitive sensing signal onto a second sensor electrode of the first plurality of sensor electrodes and receiving the second resulting signal on the second sensor electrode.

17. A method, comprising:
- driving a capacitive sensing signal onto at least one of a first plurality of sensor electrodes to detect a presence of an input object in a zero-dimensional sensing region;
- receiving a first resulting signal and a second resulting signal on one or more sensor electrodes of the first plurality of sensor electrodes based on driving the capacitive sensing signal; and
- determining whether the input object is contacting the zero-dimensional sensing region based on a ratio between the first and second resulting signals.

18. The method of claim 17, wherein determining that the input object is contacting zero-dimensional sensing region further comprises determining that (i) the ratio satisfies a first predetermined threshold and (ii) a value of the first resulting signal satisfies a second predetermined threshold.

19. The method of claim 17, further comprising:
- performing capacitive sensing in a different sensing region in at least two dimensions, the different sensing region comprising a second plurality of sensor electrodes,
- wherein at least one of the sensor electrodes of the second plurality of sensor electrodes is ohmically coupled to at least one of the sensor electrodes in the first plurality of sensor electrodes.

20. The method of claim 17, further comprising:
- performing absolute capacitive sensing in the zero-dimensional sensing region by (i) driving the capacitive sensing signal onto a first sensor electrode of the first plurality of sensor electrodes and receiving the first resulting signal on the first sensor electrode and (ii) driving the capacitive sensing signal onto a second sensor electrode of the first plurality of sensor electrodes and receiving the second resulting signal on the second sensor electrode.

21. The method of claim 17, further comprising:
performing transcapacitive sensing in the zero-dimensional sensing region by driving the capacitive sensing signal onto a first sensor electrode of the first plurality of sensor electrodes and receiving the first and second resulting signal on respective sensor electrodes of the first plurality of sensor electrodes different from the first sensor electrode.

22. The method of claim 17, wherein the zero-dimensional sensing region is a capacitive button and the first plurality of sensor electrodes comprises a first sensor electrode that receives the first resulting signal and a second sensor electrode that receives the second resulting signal, wherein at least a portion of the first sensor electrode is at a center of the capacitive button and no portion of the second sensor electrode is at the center of the capacitive button.

\* \* \* \* \*